United States Patent [19]

Lavengood

[11] Patent Number: 5,043,384

[45] Date of Patent: Aug. 27, 1991

[54] BLOW MOLDING NYLON RESINS

[75] Inventor: Richard E. Lavengood, Longmeadow, Mass.

[73] Assignee: Monsanto Company, St. Louis, Mo.

[21] Appl. No.: 227,847

[22] Filed: Aug. 3, 1988

[51] Int. Cl.⁵ ............................................. C08L 77/00
[52] U.S. Cl. ..................................... 525/66; 525/183; 525/184
[58] Field of Search ......................... 525/66, 183, 184

[56] References Cited

U.S. PATENT DOCUMENTS

| | | | |
|---|---|---|---|
| 4,319,007 | 3/1982 | Khattab | 525/183 |
| 4,532,100 | 7/1985 | Lancaster et al. | 525/183 |
| 4,713,415 | 12/1987 | Lavengood et al. | 525/66 |
| 4,777,211 | 10/1988 | Lavengood et al. | 525/66 |
| 4,804,703 | 2/1989 | Subramanion | 525/179 |

FOREIGN PATENT DOCUMENTS 0071661  4/1985  Japan .................................. 525/183

*Primary Examiner*—Ana L. Carrillo
*Attorney, Agent, or Firm*—Thomas E. Kelley; Richard H. Shear

[57] ABSTRACT

Blow molding nylon resin blends comprising nylon resin having relative viscosity of less than about 100 blended with sufficient melt viscosity enhancing polymer to be adaptable to blow molding and sheet extrusion. Such blends have a melt viscosity at low deformation rates of at least ten times the melt viscosity at low deformation rates of the nylon resin.

1 Claim, No Drawings

BLOW MOLDING NYLON RESINS

Disclosed herein are inventions relating to nylon blow molding resins comprising a nylon of low relative viscosity and a viscosity enhancing polymer, methods for preparing nylon blow molding resins, methods of blow molding such resins and blow molded articles comprising such nylon blow molding resins.

BACKGROUND

Nylons are engineering thermoplastics which are often selected for applications because of favorable balance of properties, e.g. low gas permeability, toughness against impact, resistance to deformation at elevated temperatures, tensile strength, stiffness and chemical resistance. Nylons are routinely used in fabricating articles that can be injection molded. However, because of inherently low melt viscosity at low deformation rates common nylons, e.g. nylon-6, nylon-6,6 and copolymers thereof, are generally considered unsuitable for blow molding and sheet extrusion applications. The melt viscosity at low deformation rates of such common nylons can be increased by chain extension of such nylon, e.g. by vacuum autoclaving, to provide blow moldable and sheet extrusion grades of such common nylons. Alternatively, when nylon properties are desired in blow molded articles other less common, e.g. specialty, nylons can be used. Because of the increased cost of chain extended nylons and specialty nylons many blow molding and sheet extrusion applications for nylons are avoided in favor of other more viscous polymers with a less favorable balance of properties.

An object of this invention is to provide blow moldable nylon resins based on common nylons, e.g. nylon-6, nylon-6,6 and copolymers thereof, which have an inherently low relative viscosity, e.g. about 50.

Another object of this invention is to provide methods of blow molding nylons of inherently low relative viscosity.

Still another object of this invention is to provide blow molded articles comprising nylons of low relative viscosity.

These and other objects which will be apparent from the following disclosure are achieved by blow molding nylon resin blends comprising nylon resin having a relative viscosity of less than about 100 and sufficient melt viscosity enhancing polymer so that the blend is adaptable to be blow molded or sheet extruded over a temperature range of at least about 25° C.

DETAILED DESCRIPTION OF THE INVENTION

The phrase "relative viscosity" as used herein characterizes nylon as set forth in ASTM Method E789, Nylon Characterization Methods. Common molding grades of nylon-6, nylon-6,6 and copolymers thereof generally exhibit a relative viscosity of about 50, e.g. 40 to 60.

Temperatures reported herein are in degrees Celsius except when reported in another scale.

The phrase "low deformation rates" means polymer deformation rates encountered during blow molding and/or sheet extrusion operations, for instance extension caused by gravitation force. Such low deformation rates can be characterized as equivalent to shear rates of less than $10^{-3}$ radians/second, e.g as low as $10^{-8}$ radians/seconds.

The phrase "melt viscosity at low deformation rates" as used herein means the viscosity of a thermoplastic polymer or a blend or alloy of two or more thermoplastic polymers measured at shear rates of less than $10^{-3}$ radians/seconds. For purposes of characterizing blends of this invention melt viscosity at low deformation rates are conveniently measured at a shear rate of $10^{-5}$ radians/seconds at a temperature of 20° C. above the crystalline melt temperature of the highest melting polymeric component of the blend. Because blends of compatible polymers may melt at a temperature lower than the melt temperature of at least one of the component polymers, melt viscosity of blends of compatible polymers is measured at a temperature of 20° C. above the crystalline melt temperature of the blend.

Nylon resins used in the blends of this invention include common injection molding grades of nylon resins which have insufficient melt viscosity at low deformation rates so as to be impractical for blow molding and/or sheet extrusion applications, e.g. having a melt viscosity at low deformation rates on the order of about $10^3$ poises. Such nylons include nylon-6, nylon-6,6 and copolymers of nylon-6 and nylon-6,6 having a relative viscosity of less than 100. Other useful nylon resins include rubber-modified nylon-6, rubber-modified nylon-6,6 and rubber-modified copolymers of nylon-6 and nylon-6,6 provided the nylon resin has a melt viscosity at low deformation rates on the order of about $10^3$ poises.

The blow molding nylon resins of this invention are provided by blending a melt viscosity enhancing polymer, e.g. a polymer typically used for blow molding. Such polymer should be stable at the elevated processing temperatures required for nylons; for instance, polyvinyl chloride which degrades at temperatures lower than nylon processing temperatures is not useful as a melt viscosity enhancing polymer even though it is useful by itself in blow molding applications. Among the useful melt viscosity enhancing polymers are polystyrene; rubber-modified polystyrene, e.g. HIPS; copolymers of a styrene monomer and (meth)acrylonitrile monomer, e.g. SAN; rubber-modified copolymers of a styrene monomer and a (meth)acrylonitrile monomer, e.g. ABS; polymers of $C_1$–$C_8$ alkyl (meth)acrylates; rubber-modified polymers of $C_1$–$C_8$ alkyl (meth)acrylates, e.g. Acryloid KM-330 from Rohm & Haas; copolymers of at least two monomers selected from the group consisting of styrene monomers, $C_1$–$C_8$ alkyl (meth)acrylates and (meth)acrylonitrile; rubber-modified copolymers of at least two monomers selected from the group consisting of styrene monomers, $C_1$–$C_8$ alkyl (meth)acrylates and (meth)acrylonitrile; polyethylene, e.g. HDPE; polypropylene; copolymers of ethylene and propylene; polyalkylene (tere/iso)-phthalates, e.g. PET, PBT and PETG; and mixtures thereof.

The blow molding nylon resin blends can comprise a compatibilizing polymer when the nylon and melt viscosity enhancing polymer are not compatible. A compatibilizing polymer can include a polymer that is miscible with the melt viscosity enhancing polymer and that is functionalized with a group that can interact with the nylon, e.g. carboxylic acid/anhydride groups. In some cases it is convenient to provide part or all of the melt viscosity enhancing polymer with nylon interacting groups so that a separate compatibilizing polymer is not required.

Nylon resin having a relative viscosity of less than 100, e.g. of about 50, commonly exhibit a melt viscosity at low deformation rates, e.g. at shear rates of about $10^{-3}$ radians/second, of about $10^3$ poises. The blow molding nylon resin blends of this invention comprise sufficient melt strength enhancing polymer that the blend is adaptable to blow molding and sheet extrusion over a temperature range of at least 25° C. or higher, say at least about 50° C. Such blends advantageously exhibit a melt viscosity at low deformation rate of at least ten times, or even 100 or 1000 times, the melt viscosity at low deformation rate of the nylon resin, e.g. blends will have a melt viscosity of at least $10^4$ poises or higher, say about $10^5$ poises or even $10^6$ poises at a shear rate of about $10^3$ radians/second. In still other cases advantageous blends have a melt viscosity at low deformation rates of at least about $10^7$ poises or even about $10^8$ poises.

Such blends of this invention can consist essentially of nylon and melt viscosity enhancing resin. Blends of this invention can be prepared by mixing 20 to 80 parts by weight nylon resin and 80 to 20 parts by weight of melt strength enhancing resin. Such blends can optionally comprise compatibilizing polymer, e.g. at up to about 20 parts by weight. In many cases, preferred blends comprise at least 30 parts by weight of nylon resin or less than 70 parts by weight of nylon resin. In still other cases, depending on the balance of properties desired preferred blends comprise at least 40 parts by weight of nylon resin or less than 60 parts by weight of nylon resin.

The blends of this invention are prepared by methods common in the field of polymer blends, e.g. mixing of molten polymeric components at sufficient shear to provide intimate dispersion of fine particulate phases, e.g. on the order of one micron or less, of at least one of the polymeric components in a continuous phase of the other. In other cases finely dispersed co-continuous phases of the polymeric components are advantageously achieved.

The blends of this invention are useful for blow molding and sheet extrusion operations to prepare articles having a balance of physical properties generally associated with nylon. Accordingly, aspects of this invention include articles blow molded from the blends of this invention and formed, e.g. vacuum formed or thermoformed, from extruded sheet of such blends.

A further aspect of this invention includes processes for blow molding or sheet extruding to provide articles from a blend of injection grade nylon having a relative viscosity less than about 100.

The advantages of the blends of this invention can be illustrated by the following example of a blends comprising one nylon resin, i.e. nylon-6, and one class of melt strength enhancing polymer, i.e. ABS. Injection molding grade of nylon-6, having a melt viscosity at a shear rate of $10^{-3}$ radians/second of about $10^3$ poises, was blended with ABS (butadiene core/styrene-acrylonitrile copolymer grafted shell, about 70/30 styrene/acrylonitrile ratio) and a compatibilizing terpolymer of styrene-acrylonitrilemaleic anhydride (67/32/1 mole ratio). The blend was mixed in an extruder to provide a blow molding nylon resin comprising 44 parts by weight nylon-6; the blend exhibited a melt viscosity at a shear rate of $10^{-3}$ radians/second of about $10^8$ poises and was useful in blow molding articles including bottles and other more complicated shapes. The preparation of other useful blends which can be used as blow molding resins are disclosed in U.S. Pat. Nos. 4,713,415 and 4,375,532 and in applications Ser. Nos. 07/126,044; 06/944,648; 06/881,014; and 07/014,885, the disclosures of which are incorporated herein by reference.

What is claimed is:

1. A method for fabricating molded articles comprising blow molding a resin comprising about 20 to 80 parts by weight of a nylon polymer having a relative viscosity of less than about 100 and about 80 to 20 parts by weight of a melt viscosity enhancing polymer selected from the group consisting of polystyrene, rubber-modified polystyrene, copolymers of a styrene monomer and a (meth)acrylonitrile monomer and rubber-modified copolymers of a styrene monomer and a (meth)acrylonitrile monomer, wherein said resin has a melt viscosity at a shear rate of $10^3$ radians/second of at least 100 times the melt viscosity at said shear rate of said nylon polymer.

* * * * *